United States Patent
Meheen

(10) Patent No.: US 7,615,883 B2
(45) Date of Patent: Nov. 10, 2009

(54) WIND DRIVEN VENTURI TURBINE

(76) Inventor: H. Joe Meheen, 1562 S. Parker Rd. #228, Denver, CO (US) 80231-2720

( * ) Notice: Subject to any disclaimer, the term of this patent is extended or adjusted under 35 U.S.C. 154(b) by 0 days.

(21) Appl. No.: 11/759,032

(22) Filed: Jun. 6, 2007

(65) Prior Publication Data

US 2008/0303287 A1    Dec. 11, 2008

(51) Int. Cl.
*F03B 13/00* (2006.01)
*F03D 9/00* (2006.01)

(52) U.S. Cl. .......................... 290/55; 290/54
(58) Field of Classification Search .............. 290/54–55
See application file for complete search history.

(56) References Cited

U.S. PATENT DOCUMENTS

| | | | | |
|---|---|---|---|---|
| 763,623 | A * | 6/1904 | Nance | 416/8 |
| 1,187,601 | A * | 6/1916 | Blackmore | 415/5 |
| 1,266,472 | A * | 5/1918 | Howe | 416/16 |
| 1,502,296 | A * | 7/1924 | Doak | 416/7 |
| 1,568,718 | A * | 1/1926 | Brattland | 415/4.1 |
| 3,713,503 | A * | 1/1973 | Haan | 180/2.2 |
| 3,730,643 | A * | 5/1973 | Davison | 416/8 |
| 4,049,300 | A * | 9/1977 | Schneider | 290/54 |
| 4,090,577 | A * | 5/1978 | Moore | 180/243 |
| 4,134,469 | A * | 1/1979 | Davis | 180/2.2 |
| 4,186,314 | A * | 1/1980 | Diggs | 290/55 |
| 4,494,008 | A * | 1/1985 | Patton | 290/44 |
| 4,536,125 | A * | 8/1985 | Herman et al. | 415/5 |
| 4,563,168 | A * | 1/1986 | Schneider | 474/207 |
| 4,717,790 | A * | 1/1988 | Gochermann | 136/251 |
| 4,764,683 | A * | 8/1988 | Coombes | 290/55 |
| 5,040,455 | A * | 8/1991 | Doi et al. | 454/75 |
| 5,588,909 | A * | 12/1996 | Ferng | 454/141 |
| 5,602,457 | A * | 2/1997 | Anderson et al. | 320/102 |
| 5,850,108 | A * | 12/1998 | Bernard | 290/54 |
| 6,155,635 | A * | 12/2000 | Wecker | 296/211 |
| 6,331,031 | B1 * | 12/2001 | Patz et al. | 296/211 |
| 6,435,827 | B1 * | 8/2002 | Steiner | 416/8 |
| 6,439,658 | B1 * | 8/2002 | Ganz et al. | 297/180.14 |
| 6,474,729 | B2 * | 11/2002 | Patz et al. | 296/211 |
| 6,700,215 | B2 * | 3/2004 | Wu | 290/44 |
| 6,809,430 | B2 * | 10/2004 | Diederich | 290/54 |
| 6,838,782 | B2 * | 1/2005 | Vu | 290/55 |
| 2002/0008412 | A1 * | 1/2002 | Patz et al. | 296/211 |
| 2004/0113431 | A1 * | 6/2004 | Huang | 290/55 |
| 2007/0023078 | A1 * | 2/2007 | Palladino | 136/244 |
| 2008/0303285 | A1 * | 12/2008 | Bondhus | 290/54 |
| 2009/0146434 | A1 * | 6/2009 | Fernandez | 290/55 |

FOREIGN PATENT DOCUMENTS

GB         2400413 A    * 10/2004

* cited by examiner

*Primary Examiner*—Pedro J. Cuevas
(74) *Attorney, Agent, or Firm*—Richard W. Hanes; Hanes & Schutz, LLC

(57) ABSTRACT

A venturi tube wind turbine comprising a venturi tube having inlet and outlet openings, opposed side members and a constricted throat section, where two of the opposing side members comprise rotatable endless belts each having mounted thereon a plurality of wind catching vanes.

7 Claims, 3 Drawing Sheets

WIND DRIVEN VENTURI TURBINE

FIELD OF THE INVENTION

The present invention relates generally to a wind driven electric generating turbine and more particularly to such a device that incorporates in its construction the elements of a venturi tube having a constricted throat area through which air flows to increase its velocity.

BACKGROUND OF THE INVENTION

Windmills that rotate on both horizontal and vertical shafts have long been used to turn electrical generators. Wind farms having dozens of propeller driven generators are a common sight. Less common, but part of the prior windmill art, are vertical shaft electrical generating devices such as the ones disclosed in U.S. Pat. Nos. 3,938,907, 4,364,709 and 6,962,478, to name only a few. All of these devices require a fixed structural support and depend entirely on the velocity of the wind to create rotation of the windmill.

Going beyond the fixed position windmill, the concept of utilizing the forward motion of a vehicle to produce the air velocity necessary to rotate electrical generating apparatus has also been expressed in the prior art. A sampling of U.S. patents based on the movement of a vehicle to create wind energy includes U.S. Pat. Nos. 1,903,307, 4,019,828, 6,838,782 and 6,882,059. All of the prior art disclosures that mount wind driven electrical generators on vehicles the driving energy developed by the mounted windmill is limited by the vehicle's forward speed added to whatever advantageous wind component that might be available.

It is therefore the principle object of the present invention to provide a wind driven generator that will benefit from increased air velocity through the principal of the venturi effect.

A further object of the invention is to provide a mechanism that will optimize the velocity of air that moves the turbine vanes of a wind driven electrical generator, whether the turbine arrangement is mounted on a fixed structure or mounted on a movable vehicle.

Other and further objects, features and advantages of the present invention will become apparent upon a reading of the following description of the invention, taken in connection with the accompany drawings.

SUMMARY OF THE INVENTION

The venturi effect is a special case of Bernoulli's principle. When air is made to flow through a smoothly varying constriction in a tube or pipe it is subject to an increase in velocity and a reduction in pressure in order to satisfy the conservation of energy rule. The air gains kinetic energy as it enters the constriction which is supplied by a pressure gradient force from behind. The pressure gradient reduces the pressure in the constriction, in reaction to the acceleration.

In order to utilize the venturi effect to increase the velocity of air exerting force on the turbine vanes of a wind driven electrical generator two rotatable endless turbine belts are provided in a spaced apart co-planar configuration having an area where the belts converge toward one another to a constriction zone and then diverge. Top and bottom panels that cover the sides of the belts form an enclosure that comprises the venturi tube construction. Preferably, a plurality of electrical generators are mechanically coupled to the turbine belts in order to generate electricity as the belts are turned, either by wind or by a combination of wind and vehicle speed, when the unit is mounted on a vehicle. The velocity of whatever air flow is available to pass between the turbine belts will be increased by the venturi effect created by the constricted air flow path between the belts.

DETAILED DESCRIPTION OF PREFERRED EMBODIMENT

Figure 1:
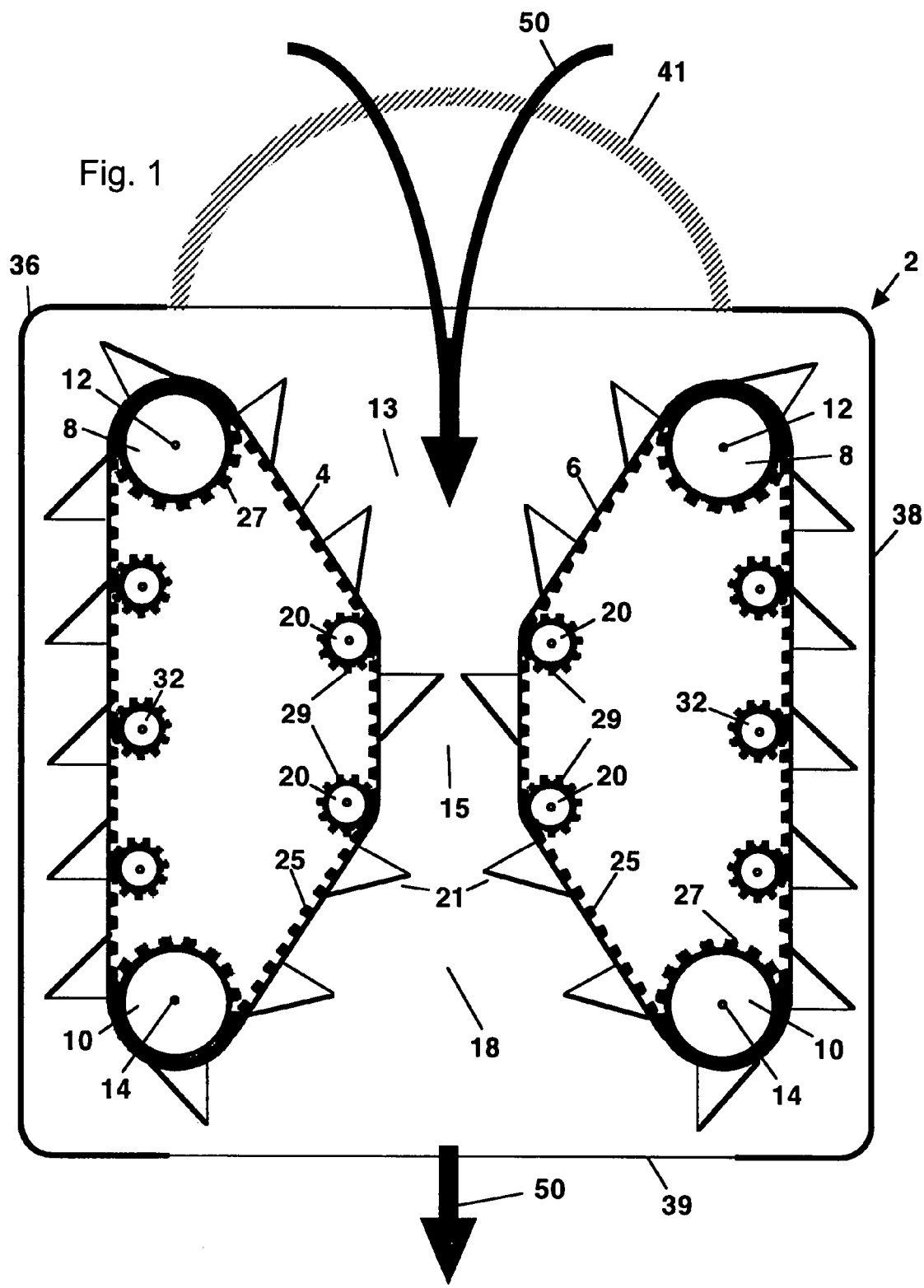
FIG. 1 is a top diagrammatic view of the endless belts of the generator turbine, without a top cover to more clearly illustrate the working components of the assembly.
Figure 4:
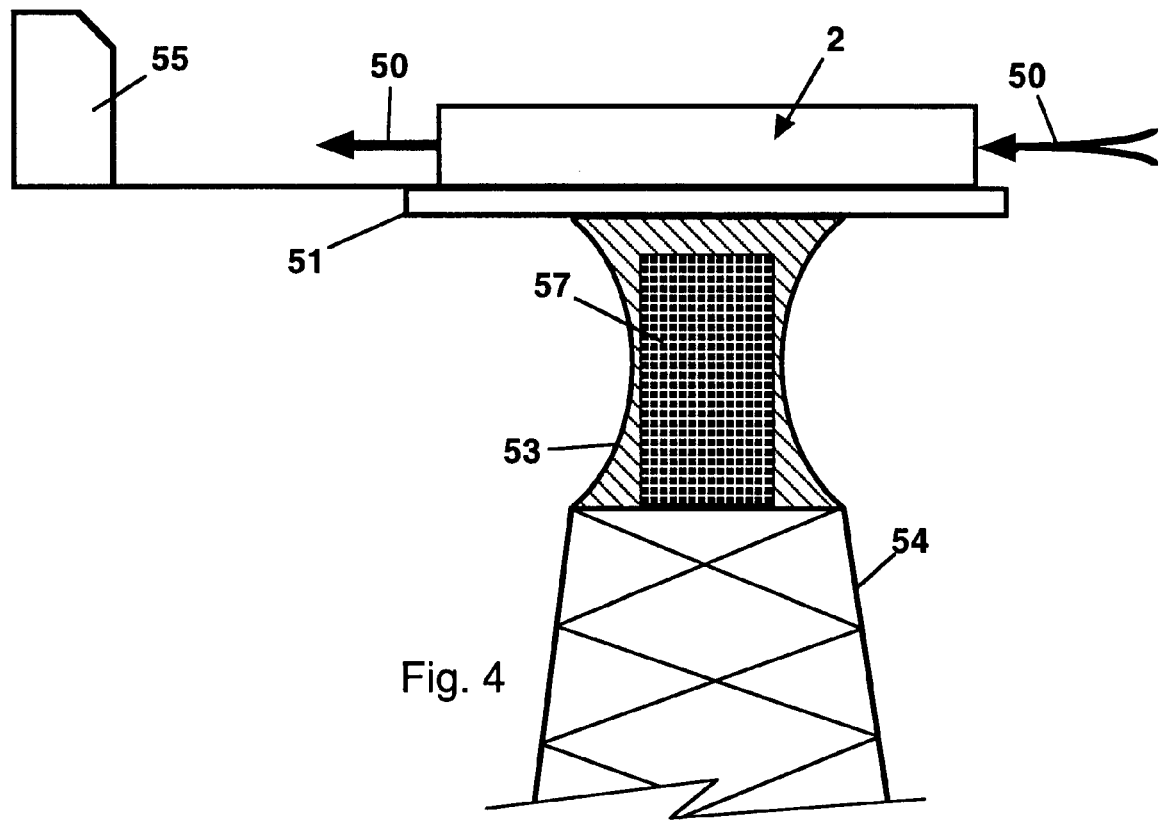
FIG. 4 is a side view of the generator turbine rotatably mounted on a fixed pedestal and having a wind vane to keep the turbine turned directly into the wind.
Figure 5:
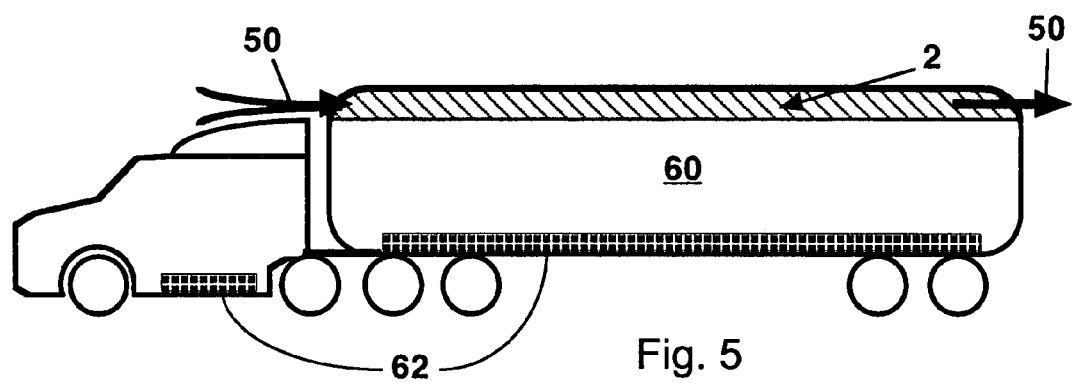
FIG. 5 is a side view of the generator turbine mounted on a semi-trailer.

The wind driven turbine generator of the present invention is shown generally by reference numeral 2 in FIGS. 1, 4 and 5. The turbine comprises two spaced apart co-planar endless belts 4 and 6. Each of the belts is supported for rotation by a pair of toothed gears 8 and 10 that rotate about vertical axle shafts 12 and 14 respectively. Spacing between the belts is configured to form the elements of a venturi tube, that is, a converging section 13, a constricted area 15 and a diverging section 18. This configuration is developed by positioning a plurality of idler wheels 20 over which the belts pass so as to define the constricted area 15 between the belts at their mid sections. Although the drawing of FIG. 1 depicts only two idler wheels for each belt, there may be additional idler wheels in order to smooth out the transitions to and from the constricted area.

Each of the turbine belts 4 and 6 include a plurality of spaced apart wind catching vanes 21 attached in a fixed position or by hinges to the outside surface of each of the belts. The inside surfaces of the turbine belts are preferably provided with a series of teeth 25 that engage the circumferential teeth 27 on the gears 8 and 10 and the teeth 29 on the idler wheels 20. Also disposed to engage the belt teeth 25 are rotatable drive gears 32 that are mechanically connected to respective electrical generators (not shown). The idler wheels 20 can also act as drive gears for operating electrical generators. Top and bottom panels 37 and 39 and side panels 36 and 38 enclose the turbine belt structure in order to complete the elements of a venturi tube. A screen 41 may be placed at the front opening of the venturi tube structure in order to keep birds and debris from entering the turbine.

In operation, air 50 enters the converging section 13 and is accelerated into higher velocity air passing through the constricted area 15. The higher velocity air exerts force on the wind catching vanes 21 to rotate the turbine belts 4 and 6, thus turning the drive gears 32 that rotate connected electrical generators to produce electrical energy.

Figure 2:
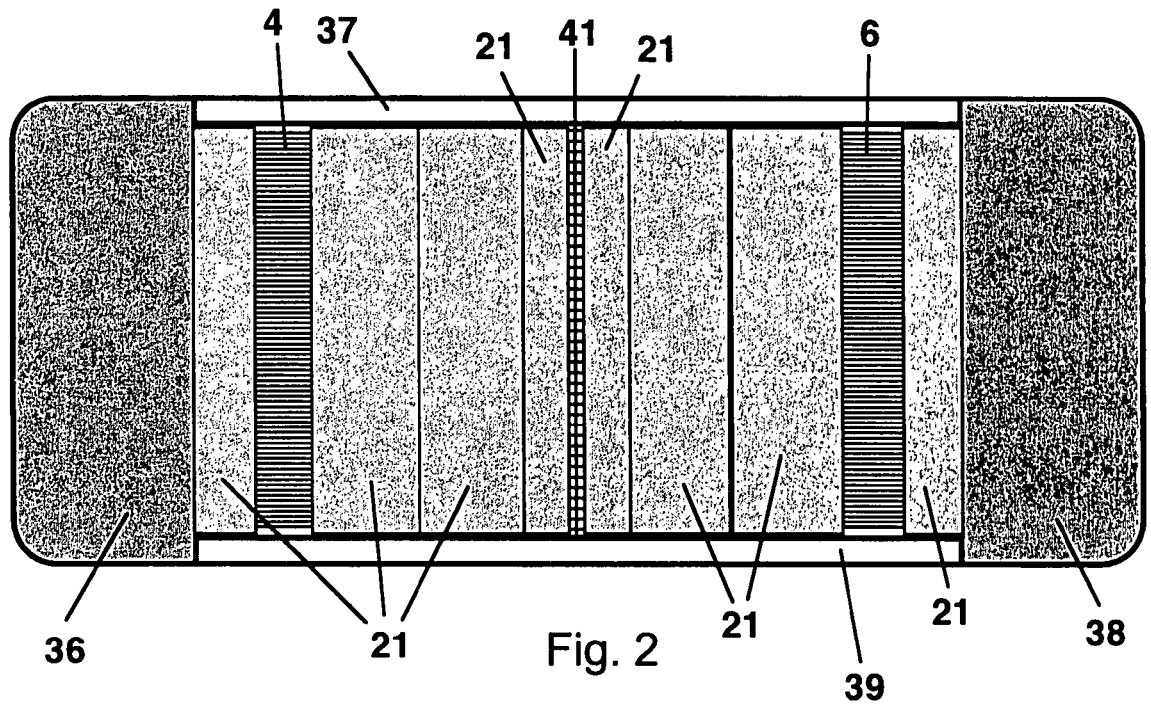
FIG. 2 is a rear end view of the generator turbine.
Figure 3:
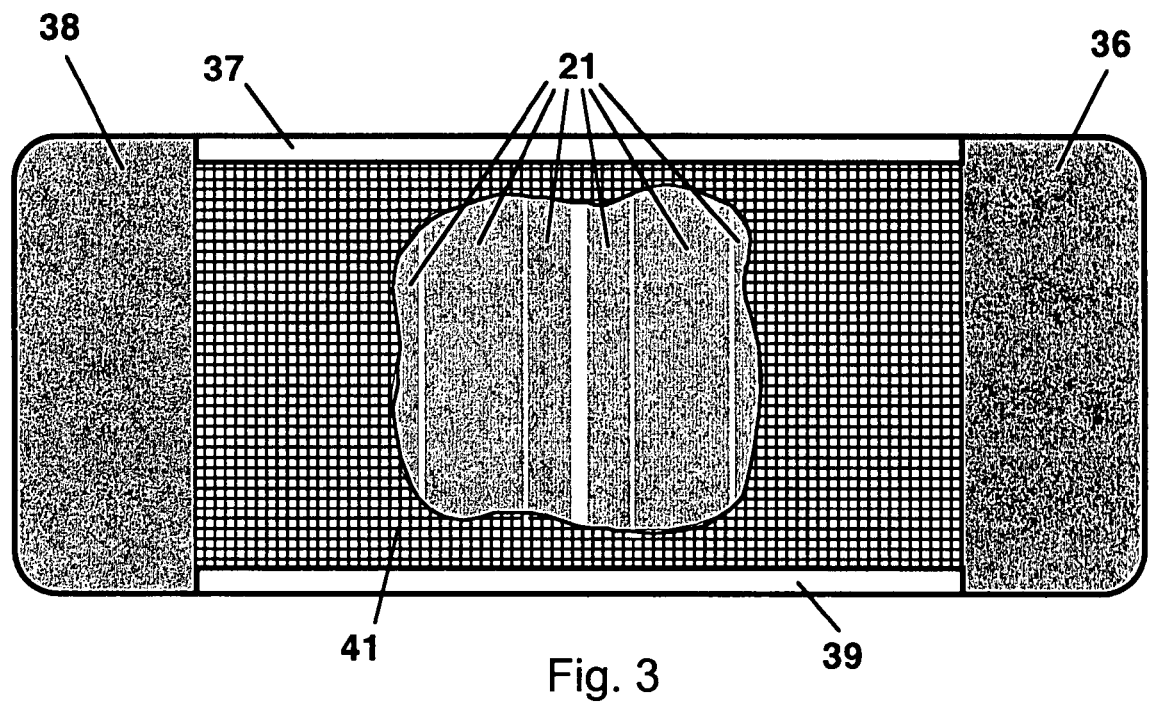
FIG. 3 is a front end view of the generator turbine.

The basic venturi turbine structure illustrated in FIGS. 1, 2 and 3 can be sited in any one of several types of support settings. As seen in FIG. 4 the turbine assembly can be housed on a rotatable platform 51 that is mounted on a pedestal 53 superimposed on a power line transmission tower 54. In addition to the supplying electrical power directly into the power grid through the transmission lines (not shown), the venturi generator 2 can be arranged to supply power to batteries 57 disposed interiorly of the pedestal 53. Preferably the platform 51 would be equipped with a wind vane 55 that would maintain the turbine pointed into the wind.

FIG. 5 illustrates the mounting of the venturi generator 2 on the top of a semi-trailer 60 where the output of the generators would be used to charge the batteries 62 that provide electrical energy to the truck vehicle or to the refrigeration of the semi-trailer. Preferably, the storage batteries are located at the bottom of the trailer to act as ballast in high cross winds and counteract the extended height of the trailer created by the venturi generator. The amount of energy generated by the venturi wind generator is sufficient to permit the batteries to be utilized for a hi-bred gasoline/electric motor system to reduce fuel consumption.

What is claimed is:

1. A wind driven electric generator comprising,
    a pair of coplanar endless loop rotatable belts each having interior and exterior surfaces and each having a driving side and a return side where the driving sides are mutually opposed and spaced apart and where the spacing between the driving sides comprises a converging section with an air flow entrance, a narrow throat section and a diverging section,
    a plurality of spaced apart wind catching vanes mounted on the exterior surfaces of each of said belts,
    at least one rotatable electrical generator, and
    means carried by the interior surface of at least one of said belts for operatively engaging the at least one electrical generator for imparting rotation to the generator.

2. The combination of claim 1 and further including,
    means mounting the belts for rotation about vertical axes.

3. The combination of claim 2 where the means mounting the belts for rotation includes a vehicle.

4. The combination of claim 3 and further including,
    at least one electrical storage battery carried by the vehicle, and
    means interconnecting the battery to the at least one generator.

5. The combination of claim 4 where the vehicle includes at least one engine water cooling radiator disposed adjacent the air flow entrance of the convergent section.

6. The combination of claim 4 and further including,
    a top cover having an upper surface and disposed over the endless loop belts,
    a plurality of interconnected photovoltaic cells mounted on the upper surface of the top cover, and
    electrical connectors interconnecting the photovoltaic cells to the at least one battery.

7. A venturi tube wind turbine comprising,
    a venturi tube having inlet and outlet openings, opposed side members and a constricted throat section, where two of the opposing side members comprise,
    rotatable endless belts each having mounted thereon a plurality of wind vanes.

* * * * *